United States Patent [19]
Miller

[11] Patent Number: 4,598,818
[45] Date of Patent: Jul. 8, 1986

[54] ACCUMULATING CONVEYOR

[75] Inventor: Jack E. Miller, St. Clair Shores, Mich.

[73] Assignee: Harry Major Machine & Tool Co., Fraser, Mich.

[21] Appl. No.: 761,584

[22] Filed: Aug. 1, 1985

[51] Int. Cl.[4] .............................................. B65G 17/00
[52] U.S. Cl. ................................ 198/803.2; 198/465.3
[58] Field of Search .............. 198/465.3, 803.2, 465.1, 198/803.01; 29/33 P, 563

[56] References Cited

U.S. PATENT DOCUMENTS 3,319,765 5/1967 Hasenwinkle et al. .
3,949,859 4/1976 Nussbaumer et al. ........... 198/803.2
4,062,444 12/1977 Nakov et al. .................... 198/803.2
4,088,220 5/1978 Jacksch et al. .

Primary Examiner—Joseph E. Valenza
Assistant Examiner—Lyle Kim
Attorney, Agent, or Firm—Basile, Weintraub & Hanlon

[57] ABSTRACT

An accumulating endless roller chain conveyor is provided with independently movable, article supporting pallets or carriers mounted upon the roller chains to be frictionally conveyed with the continuously driven chains along the horizontal upper and lower runs of the chains and to be positively coupled to the chains while moving around the end sprockets of the conveyor between the upper and lower runs. The carriers may be stopped at any point along the upper or lower runs without interferring with the continuous movement of the chains.

7 Claims, 5 Drawing Figures

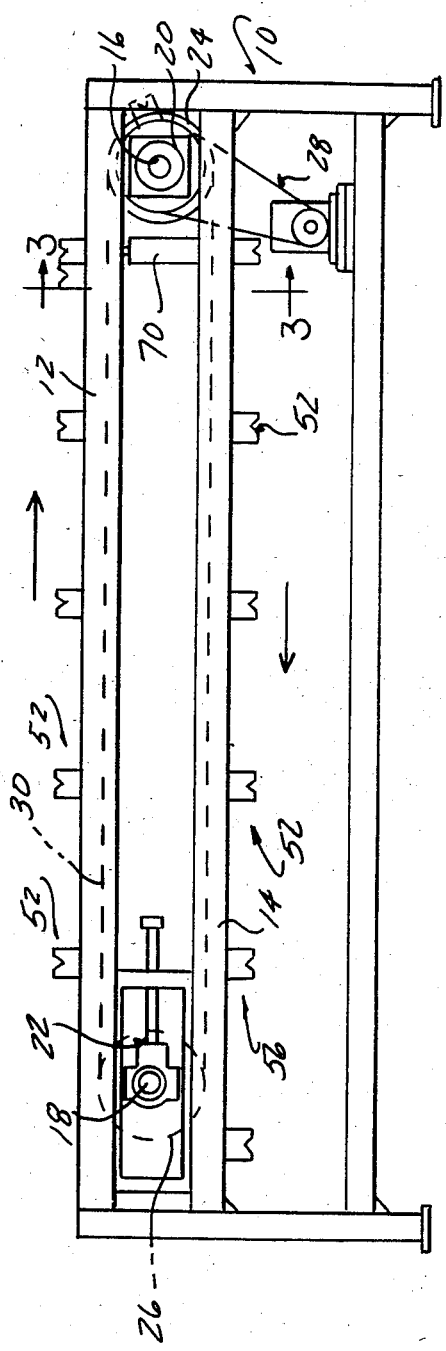
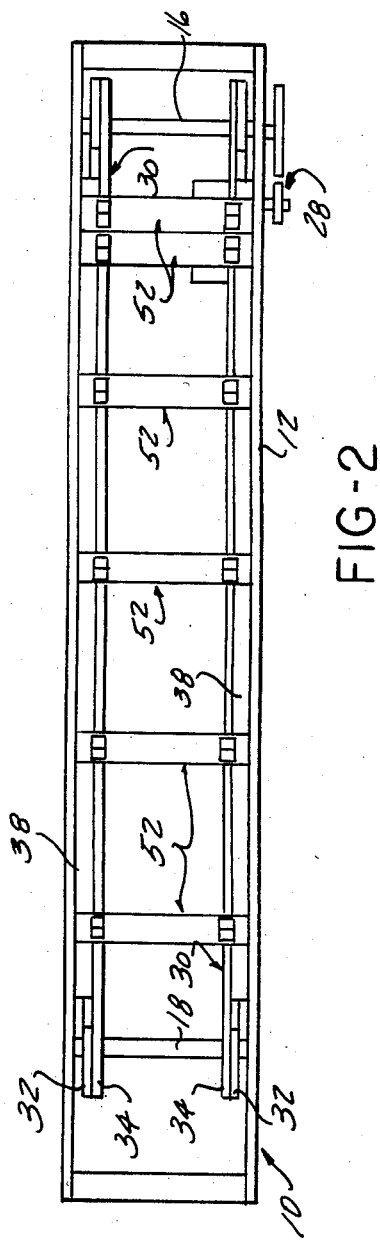

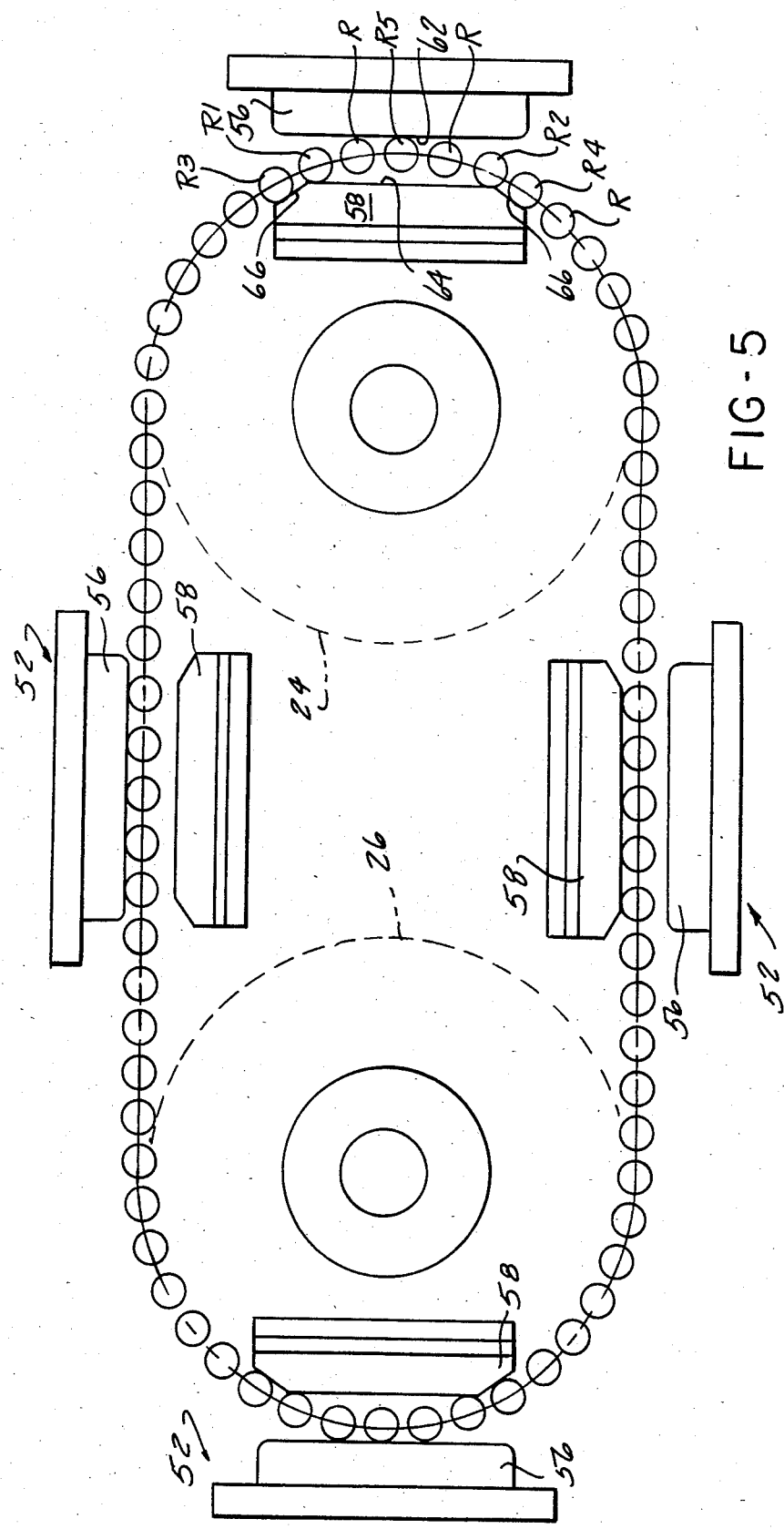

ACCUMULATING CONVEYOR

BACKGROUND OF THE INVENTION

The present invention is directed to an accumulating conveyor upon which articles may be stored or accumulated to be advanced to a work station only when the work station is ready to receive an article.

A typical application of such a conveyor is in a production line where, due to the nature of an operation performed on the article at the work station, the rate at which articles are discharged from the work station is a variable rate or a rate which is less than the rate at which articles can be supplied to the work station. When the work station is occupied, the conveyor functions to halt the flow of articles to the work station, thus accumulating a line of articles upstream from the work station so that articles can be supplied to the work station as fast as the work station is ready to accept them. The basic requirement of such a conveyor is that it must be able, while being continuously operated, to advance articles intermittently in accordance with the requirements of the work station.

In the prior art, a walking beam type conveyor is conventionally used to perform the foregoing function. Uniformly spaced article receiving seats are located along the fixed frame of the conveyor and a lift-and-carry mechanism is associated with each seat which is operable in a cyclic sequence to lift and carry an article from one seat to the next advanced seat to advance the articles in step-by-step movement along the conveyor. The various lift-and-carry mechanisms are interlinked with each other so that only those lift-and-carry mechanisms which are upstream from an empty seat will be actuated to advance articles in an operating cycle. Prior art examples of such conveyors are found in U.S. Pats. Nos. 4,441,606 and 4,240,542.

While the walking beam type accumulating conveyor is widely used, it possesses certain inherent drawbacks. A lift-and-carry mechanism must be provided at each station, together with a sensing mechanism at each station which detects the presence or absence of a part or article at that station to signal all upstream stations as to whether they are to act in the transfer or nontransfer mode during the next cycle. The intermittent step-by-step operation relies upon a reciprocatory drive mechanism which subjects a multitude of interconnected system parts to impact loading at stroke reversal and which is subjected to a variable loading, depending upon the number of parts which are to be advanced, upon the actuating stroke. The articles conveyed in turn must be bodily lifted from the conveyor frame, advanced, and then lowered gently back onto the conveyor frame a substantial number of times in order to transit the conveyor.

The present invention overcomes the foregoing problems by employing a continuously driven roller chain conveyor on which are mounted a plurality of article carriers which are so mounted upon the chains they may either move with or relative to the chains so that a carrier may be stopped at any desired location along a horizontal run of the chain while the chain continues to move.

SUMMARY OF THE INVENTION

In accordance with the present invention two transversely spaced, endless, multiple-strand roller chains of commercially available construction are operatively trained about paired end sprockets, the one or more strands of each chain being meshed with the sprockets and another strand of the chain spaced laterally clear of the end sprockets. Guide tracks fixedly mounted upon the conveyor frame support and guide the sprocket meshed strand(s) of each chain in movement along horizontal upper and lower runs. The chains are driven in continuous, constant speed movement in one direction along their respective endless paths.

A plurality of individual pallets or carriers are supported upon and extend transversely between the unmeshed strands of the two chains. At each end of each carrier, vertically disposed and aligned inner and outer support plates are fixedly mounted upon the carrier, the outer support plates being on the outer side of the endless path of the chains and the inner support plates being on the inner side. The support plates have opposed, spaced, parallel edges which extend horizontally when the carrier is on the upper or lower run of the chain. The spacing between these edges is greater than the diameter of the rollers of the chains. When the carrier is on the upper run of the chain, it is supported upon the chains by the flat edges of the outer support plates, these flat edges spanning at least three successive rollers on the chains. At this time, the opposed edge of the inner support plate is spaced below the chain rollers. As the chain is driven, the carrier is frictionally carried along with the chain unless the carrier is engaged by a stop, at which time the chain will continue to drive freely under the flat edge of the support plate.

When the carrier begins to transit the end sprockets, the edge of the inner support plate bridges three or more rollers; and as these rollers move along the curved path about the end sprocket, the flat edge of the inner support plate eventually engages only two nonadjacent rollers on the chain. Beveled end sections on the support plate edge become seated between these last rollers and the rollers adjacent those two upon which the flat edge is seated. At the same time, the flat edge of the outer support plate tangentially engages the outer side of a roller intermediate the two nonadjacent rollers whose inner sides are engaged by the inner support plate edge. This action positively and mechanically traps the carrier between chain pitches to control movement of the carrier from the upper to the lower run about the end sprocket and to enable it to be lifted upwardly from the lower run around the end sprockets to the upper run.

Other objects and features of the invention will become apparent by reference to the following specification and to the drawings.

IN THE DRAWINGS

FIG. 1 is a simplified, schematic-type side elevation of an accumulating conveyor embodying the present invention;

FIG. 2 is a simplified, partially schematic, top plan view of the conveyor of FIG. 1;

FIG. 5 is a schematic diagram illustrating the manner in which the carriers are carried about the end sprockets of the conveyors.

Figure 3:
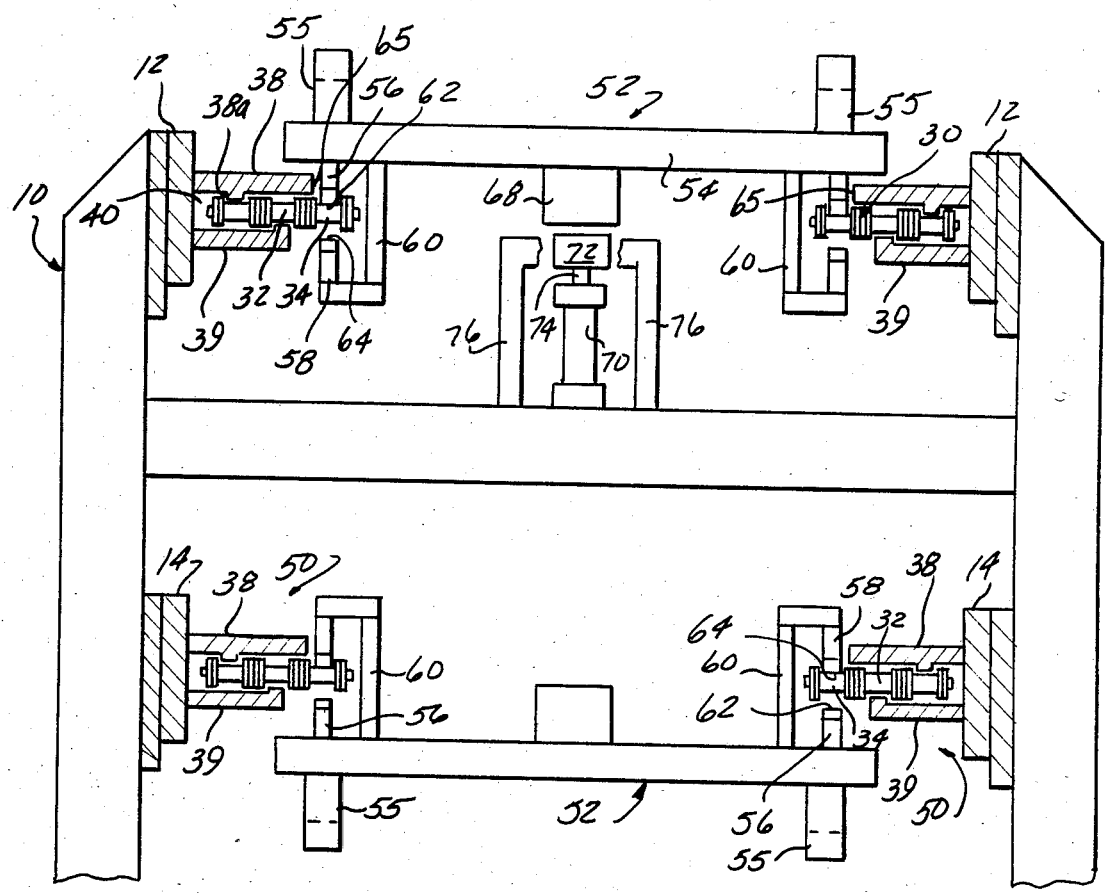
FIG. 3 is a partial transverse cross-sectional view of the conveyor of FIG. 1 taken on the line 3—3 of FIG. 1.

Referring first to FIGS. 1 and 2, which are simplified side and top views of a conveyor embodying the invention, the conveyor frame designated generally 10 includes a pair of horizontal upper side rails 12 and lower side rails 14 fixedly mounted on the frame at opposite sides of the conveyor to extend the entire length of the frame. A pair of shafts 16 and 18 are supported at each end between upper rails 12 and lower rails 14 for rotation about parallel, horizontal axes. The shaft 16 is mounted in a suitable fixed bearing assembly 20 for rotation about an axis fixed relative to the frame 10, while the opposite shaft 18 is supported from frame 10 to be adjusted longitudinally of the frame, as by a chain tensioner assembly designated generally at 22.

Each of shafts 16 and 18 carries a pair of sprockets of equal diameter, the sprockets 24 which are fixed to shaft 16 for rotation with the shaft are respectively located adjacent the opposed side rails, as are the sprockets 26 on shaft 18. Shaft 16 is driven in continuous rotation as by a drive assembly designated generally 28.

A pair of triple-strand roller chains 30 are operatively trained about end sprockets 24, 26, one chain adjacent each side of the conveyor frame as best seen in FIG. 2. Only the central strand 32 of each chain is meshed with the sprockets; the inner strand 34 of each chain is laterally offset clear of the sprockets for reasons which will become apparent.

Referring now to FIG. 3, it is seen that longitudinally extending upper and lower track members 38, 39 are fixedly mounted upon the inner side of each upper side rail 12. The upper track member 38 is formed with a downwardly projecting guide rail 38a which engages the top of the rollers of the outer strand 41 between sprocket 24 to a sprocket 26. Lower track member 39 has an upwardly projecting support-guide rail which underlies and supports the rollers of central strand 32 of the chain along its upper run. The guide track cooperatively defined by members 36 and 38 extends substantially entirely, but not completely, the entire distance between the points at which the chain passes onto or from the end sprockets. A similar guide track assembly designated generally 50 is fixedly mounted at the inner side of each lower side rail 14.

Figure 4:
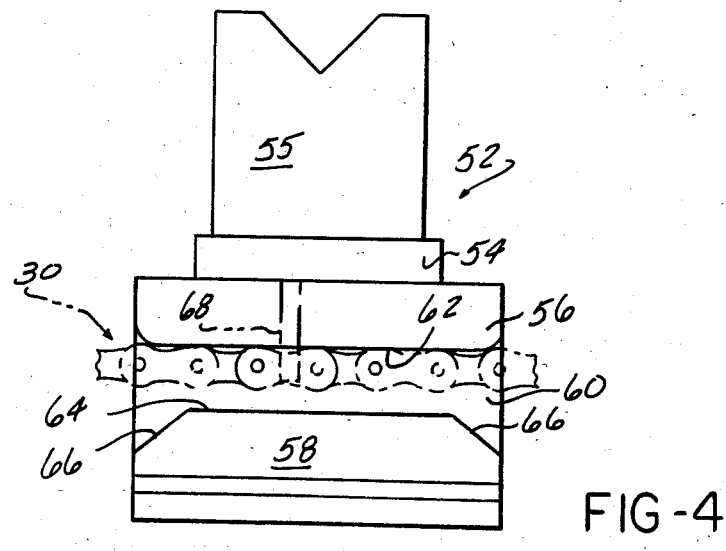
FIG. 4 is a side elevational view of a carrier employed on the conveyor of FIG. 1.

A plurality of pallets or article carriers designated generally 52 are carried by the respective inner strands 34 of chains 30. The carriers 52 are best seen in FIGS. 3 and 4 and include a cross frame member 54 whose opposite ends overlie the respective chains 30. At the upper side of each cross frame member 54, a pair of article support cradles 56 suitably configured in accordance with the article to be carried are fixedly mounted. A vertically disposed outer support plate 56 is fixedly mounted on the under side of cross frame member 54, one outer support plate 56 being located near each end of member 54 to be respectively vertically aligned with the inner strands 34 of the respective chains 30. An inner support plate 58 is fixedly mounted upon a bracket 50 to be located in spaced vertical alignment with the associated outer support plate 56. Support plates 56 and 58 are identified as inner and outer plates respectively in view of the fact that outer support plate 56 lies at the outer side of the endless path of chain 30, while the inner support plate 58 lies at the inner side of this path.

As best seen in FIG. 4, support plates 56 and 58 are formed with spaced parallel edges 62 and 64 respectively, these edges being spaced from each other by a distance greater than the diameter of the rollers of chain 30. As best seen in FIG. 2, when a carrier 52 is on the upper run of chain 30, it is supported on the chain by the engagement of the edges 62 of outer support plates 56 upon rollers R of the inner strand 34 of the chain. When the carrier is on the lower run of the chain, it is suspended in an upside-down position with the edges 64 of its inner support plates resting upon the inner strand of the chain. As best seen in FIG. 4, the length of the edge 62 (and 64) spans at least three successive rollers R of the chain and is chosen to exceed by a slight amount a selected whole multiple, preferably four, of the chain pitch—that is, the edge spans five rollers.

The inner edge 65 of the upper track 38 is located closely adjacent the path of outer support plates 56 to provide guidance to the carriers and to maintain them square to the path of movement.

When a carrier 52 is located on either the upper or lower run of the chains, movement of the chains will normally advance the carrier with the chain by virtue of the friction between the chain rollers and the engaged support plate. However, if the carrier is physically restrained by some external force against movement with the chain along either of these horizontal runs, the chain is free to move relative to the carrier with the rollers of strand 34 rolling along the flat surface 62 (or 64) of the engaged support plate. At the opposite ends of the flat edge 64 of inner support plate 58, beveled edge sections 66 are inclined from the flat edge section 64 at an included obtuse angle (typically but not necessarily about 150°) for a reason to be described below. Similar bevels may be provided on the outer support plate 56 in order that the inner and outer support plates may be of the same size and shape to simplify part replacement; however, the beveled edge sections have a function only on the inner support plates 58.

A stop plate 68 projects from the under side of each carrier 52. Retractable stop assemblies, which may take the form of a pneumatic motor 70 having a stop paddle 72 mounted upon its piston rod 74 for sliding movement up and down within a frame assembly such as 76, may be mounted at any suitable location along the upper or lower run of the conveyor. Actuation of motor 70 from the retracted position shown in FIG. 3 will elevate the stop paddle 72 into the path of the stop plates 68 of the carriers to stop a carrier at the selected location along the upper (or lower) run of the conveyor. When a carrier 52 is stopped, chain 30 continues in its continuous movement, simply rolling along the flat edge 62 (or 64) so that carriers can be accumulated in head-to-tail relationship as desired.

To couple the carriers to chains 30 while the carriers transit the end sprockets, as is required to convey the carriers upwardly around end sprockets 26 from the lower or return run of the chains to the upper run, the spacing between edges 62 and 64 of the inner and outer support plates and the length of these edges, particularly edge 64 of the inner support plate, is selected with respect to the pitch of chains 30 and the sprocket diameter in a manner schematically illustrated in FIG. 5. In FIG. 5, the path of the rollers R around an end sprocket is schematically illustrated. The flat edge 64 of an inner support plate 58 when passing around the sprocket is seen, in FIG. 5, to engage two nonadjacent rollers R1, R2 with the beveled edge sections 66 at the opposite ends of flat edge 64 engaging rollers R3 and R4 which are respectively adjacent rollers R1 and R2. The edges 64, 66 are held in the position shown by the engagement of the edge 62 of the outer support plate 56 with a roller R5 which is intermediate the nonadjacent rollers R1 and R2 engaged by edge 64. Thus, the carriers must move with the chain as the chain transits the end sprockets.

The system described allows the use of a smoothly and continuously running roller chain system in which individual pallets or article carriers may be continuously circulated around an endless path and stopped or accumulated as desired at any point along either the upper and lower horizontal run of that path without interfering with the continuous movement of the endless chain. The individual pallets or carriers automatically trap themselves to the chains to be positively driven by the chains when being transferred from the lower to the upper run or vice versa.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. For use in combination with an accumulating conveyor comprising a pair of like end sprocket means of like radius mounted for rotation about spaced, parallel, horizontal axes, and endless multiple-strand roller chain, at least one strand of said chain being operatively trained in tension about said end sprocket means, means for supporting and guiding said one strand of said chain along horizontal upper and lower runs extending between said sprocket means, a second strand of said chain being supported by said one strand laterally clear of said sprocket means and said means for supporting and guiding, and drive means for driving said chain in continuous movement along an endless path:

an article carrier adapted to be mounted on said second strand of said chain, said carrier including mounting means mounted on the carrier and engaged with said second strand to support the carrier upon said second strand and operable to frictionally couple the carrier to said chain when the carrier is on the upper or lower run of the chain;

said carrier having a frame and said mounting means comprising a rigid outer support plate and a rigid inner support plate fixedly mounted on said frame to be respectively located at the outer and inner side of the endless path of movement of said second strand, said support plates having opposed chain engaging edges including opposed straight edge sections extending in fixed, spaced relationship to each other and spaced from each other by a distance greater than the diameter of the rollers of said chain, the straight edge section of said outer support plate having a length sufficient to span a plurality of rollers of said chain to stably support said carrier upon said second strand of said chain when said carrier is located on said upper run and the straight edge section of said inner plate having a length sufficient to span a plurality of rollers of said chain to stably support said carrier upon said second strand when said carrier is located on said lower run, said chain engaging edge of said inner plate terminating at opposite ends in beveled edge sections inclined from the straight edge section inwardly of said endless path at an obtuse included angle, the fixed spacing between the chain engaging edges of said inner and outer plates and the length of the straight edge section of said inner plate being related to the radius of said sprocket means and the pitch of said chain such that during transit of said plates around the curved portions of said endless path defined by said sprocket means said edge on said outer plate contacts the outer side of one roller of said second strand, the chain engaging edge section of said inner plate contacts at least two rollers of said second strand respectively spaced ahead and behind said one roller with respect to the direction of travel of said chain, and at least one beveled edge section of said chain engaging edge of said inner plate simultaneously engages a roller of said second strand adjacent one of said two rollers.

2. The invention defined in claim 1 wherein said multiple-strand chain is a triple-strand chain, said means for supporting and guiding comprising a first guide member engageable with the rollers of one strand of said chain at the outer side of said endless path, and a second guide member engageable with the rollers of another strand of said chain at the inner side of said endless path.

3. The invention defined in claim 1 wherein said chain engaging edge of said inner plate has a length L greater than a whole multiple N of the pitch P of said chain and less than $(N+1)P$ and the overall length of said inner plate including said beveled edge sections is approximately $(N+2)P$.

4. The invention defined in claim 1 further comprising retractable stop means mounted on said frame at a location on said upper run and operable in an extended position to positively stop movement of a carrier at a selected location on said upper run while accommodating continuous movement of said chain.

5. The invention defined in claim 3 wherein during transit of said chain around one of said sprockets, said chain engaging edge of said inner plate engages only two non-adjacent rollers of said second strand and projects tangentially beyond said two rollers into the space between the next adjacent rollers with at least one of the beveled edge sections on said inner plate engaged with one of said next adjacent rollers.

6. The invention defined in claim 1 wherein said straight edge sections of said inner and outer plates extend in parallel relationship to each other and said inner plate having beveled edge sections that are symmetrically inclined, said one roller engaged by the straight edge section of said outer plate during transit of the curved portion of said path being located midway between and nonadjacent to the two rollers engaged by said chain engaging edge of said inner plate.

7. The invention defined in claim 6 wherein the said two rollers are tangentially engaged by the straight edge section of said inner plate respectively closely adjacent the juncture of said straight edge section with said beveled edge sections.

* * * * *

UNITED STATES PATENT AND TRADEMARK OFFICE
CERTIFICATE OF CORRECTION

PATENT NO. : 4,598,818

DATED : July 8, 1986

INVENTOR(S) : Jack E. Miller

It is certified that error appears in the above-identified patent and that said Letters Patent is hereby corrected as shown below:

The title page showing the illustrative figure should be deleted to appear as per attached page.

Signed and Sealed this

Fourteenth Day of October, 1986

[SEAL]

Attest:

DONALD J. QUIGG

*Attesting Officer*  *Commissioner of Patents and Trademarks*

United States Patent [19]

Miller

[11] Patent Number: 4,598,818
[45] Date of Patent: Jul. 8, 1986

[54] ACCUMULATING CONVEYOR

[75] Inventor: Jack E. Miller, St. Clair Shores, Mich.

[73] Assignee: Harry Major Machine & Tool Co., Fraser, Mich.

[21] Appl. No.: 761,584

[22] Filed: Aug. 1, 1985

[51] Int. Cl.[4] .............................................. B65G 17/00
[52] U.S. Cl. .................................. 198/803.2; 198/465.3
[58] Field of Search ............... 198/465.3, 803.2, 465.1, 198/803.01; 29/33 P, 563

[56] References Cited

U.S. PATENT DOCUMENTS

| | | |
|---|---|---|
| 3,319,765 | 5/1967 | Hasenwinkle et al. |
| 3,949,859 | 4/1976 | Nussbaumer et al. ......... 198/803.2 |
| 4,062,444 | 12/1977 | Nakov et al. ................. 198/803.2 |
| 4,088,220 | 5/1978 | Jacksch et al. |

Primary Examiner—Joseph E. Valenza
Assistant Examiner—Lyle Kim
Attorney, Agent, or Firm—Basile, Weintraub & Hanlon

[57] ABSTRACT

An accumulating endless roller chain conveyor is provided with independently movable, article supporting pallets or carriers mounted upon the roller chains to be frictionally conveyed with the continuously driven chains along the horizontal upper and lower runs of the chains and to be positively coupled to the chains while moving around the end sprockets of the conveyor between the upper and lower runs. The carriers may be stopped at any point along the upper or lower runs without interferring with the continuous movement of the chains.

7 Claims, 5 Drawing Figures

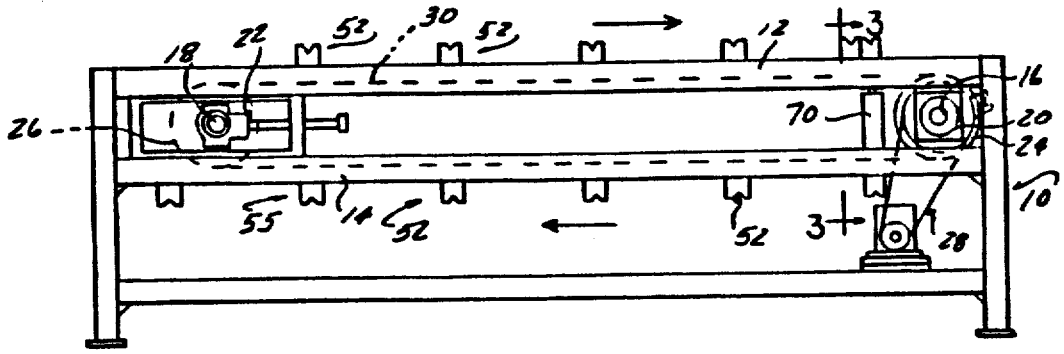

UNITED STATES PATENT OFFICE
CERTIFICATE OF CORRECTION

Patent No. 4,598,818                    Dated July 8, 1986

Inventor(s) Jack E. Miller

It is certified that error appears in the above-identified patent and that said Letters Patent are hereby corrected as shown below:

Column 3, line 24, after "strand 32" insert --and outer strand 41--.

Column 3, line 38, delete "reference numeral 36" and insert --39--.

Column 3, line 50, delete "reference numeral 56" and insert --55--.

Column 3, line 58, delete "reference numeral 50" and insert --60--.

Column 3, line 68, delete "Fig. 2" and insert --Fig. 3--.

In The Drawings,

Sheet 1, Fig. 1, the reference numeral 56 applied to the article support cradles should be changed to reference numeral 55.

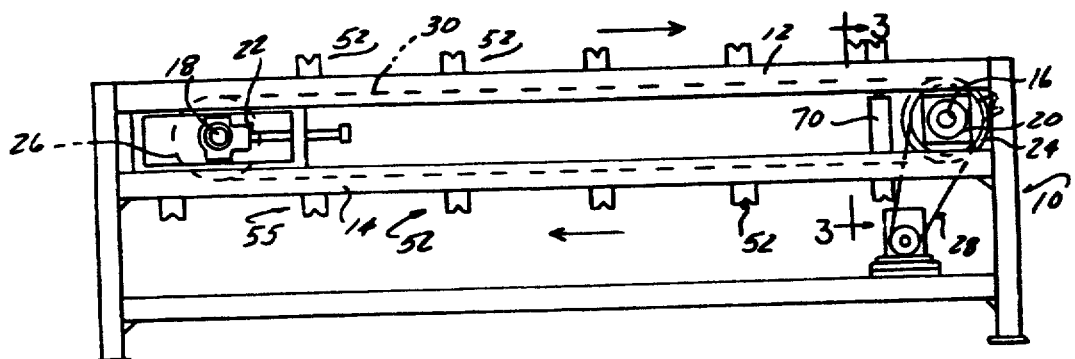

FIG-1

UNITED STATES PATENT OFFICE
CERTIFICATE OF CORRECTION

Patent No. 4,598,818  Dated July 8, 1986

Inventor(s) Jack E. Miller

It is certified that error appears in the above-identified patent and that said Letters Patent are hereby corrected as shown below:

In The Drawings,

Sheet 2, Fig. 3, the reference number 41 applied to the outer strand of the triple strand roller chain 30 should be added.

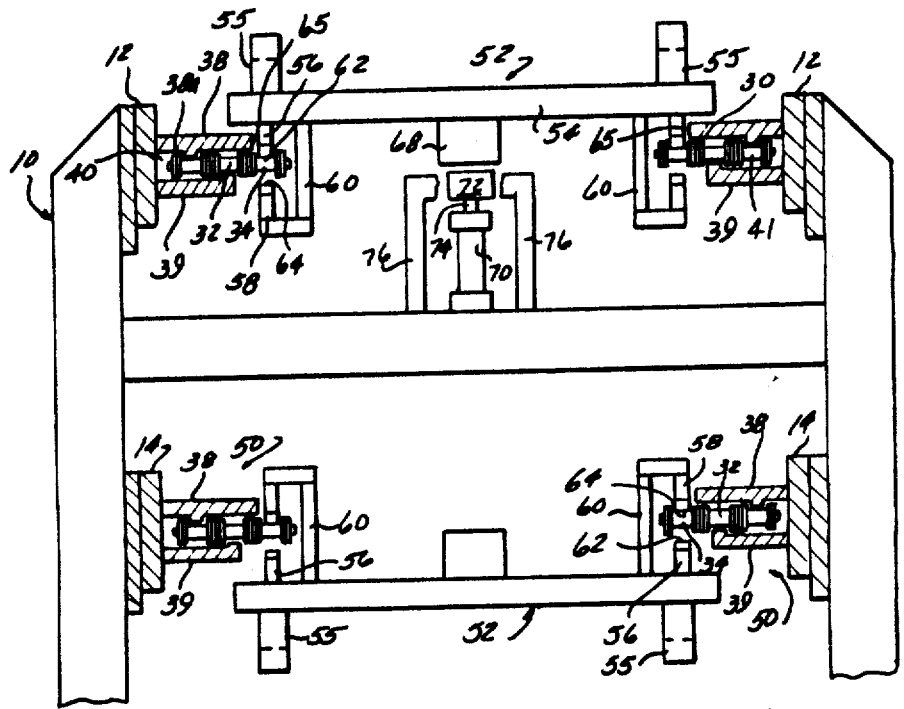

FIG-3